US012445352B1

(12) United States Patent
Liaghati et al.

(10) Patent No.: US 12,445,352 B1
(45) Date of Patent: Oct. 14, 2025

(54) SYSTEMS AND METHODS FOR A TELEMETRY INTERACTIVE PERMUTATION MATRIX

(71) Applicant: The Boeing Company, Arlington, VA (US)

(72) Inventors: Amir Leon Liaghati, Irvine, CA (US); Eric B. Delmonico, Huntsville, AL (US); Charles Muwonge, Huntsville, AL (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/636,618

(22) Filed: Apr. 16, 2024

(51) Int. Cl.
*H04L 41/0823* (2022.01)
(52) U.S. Cl.
CPC ............... *H04L 41/0823* (2013.01)
(58) Field of Classification Search
None
See application file for complete search history.

(56) References Cited

U.S. PATENT DOCUMENTS

| 12,072,783 | B1* | 8/2024 | Najaryan | G06F 11/3495 |
| 2015/0007173 | A1* | 1/2015 | Ionescu | G06F 9/45533 718/1 |
| 2020/0259700 | A1* | 8/2020 | Bhalla | G06F 3/0482 |
| 2022/0229703 | A1 | 7/2022 | Liaghati | |
| 2022/0229766 | A1* | 7/2022 | Jain | G06F 11/3409 |
| 2023/0393768 | A1 | 12/2023 | Liaghati | |
| 2024/0129214 | A1* | 4/2024 | Divan Koller | H04L 41/0816 |

OTHER PUBLICATIONS

Extended European Search Report for European Application No. 25156444.9 dated May 23, 2025, 8 pages.

* cited by examiner

*Primary Examiner* — Mohamed Ibrahim
(74) *Attorney, Agent, or Firm* — Harrity & Harrity, LLP

(57) ABSTRACT

A method, computer program product, and computer system for identifying, by a computing device, a plurality of information associated with a telemetry system. A permutation matrix may be constructed for use with the telemetry system. One or more parameters for use in the permutation matrix may be extracted based upon, at least in part, the plurality of information associated with the telemetry system. A plurality of iterations may be performed with the permutation matrix based upon, at least in part, the one or more parameters extracted for use in the permutation matrix. A final telemetry geometry may be provided for the telemetry system.

20 Claims, 10 Drawing Sheets

SYSTEMS AND METHODS FOR A TELEMETRY INTERACTIVE PERMUTATION MATRIX

The invention described herein was made in the performance of work under NASA Contract No. (NNM07AB03C) and is subject to the provisions of Section 305 of the National Aeronautics and Space Act of 1958 (72 Stat.435: 42U.S.C.2457.)

BACKGROUND

Generally, qualification of test data is one of the key parts of validation, which requires a lot of planning, cost and effort. To test and analyze certain systems that are multiplexed together then transmitted to ground, involves creating procedures, releasing documents, labor to install all components, executing tests, analyzing test data, and documenting results, while potentially under aggressive timeline to complete all tasks.

SUMMARY

In one example implementation, a method, performed by one or more computing devices, can include but is not limited to identifying, by a computing device, a plurality of information associated with a telemetry system. A permutation matrix may be constructed for use with the telemetry system. One or more parameters for use in the permutation matrix may be extracted based upon, at least in part, the plurality of information associated with the telemetry system. A plurality of iterations may be performed with the permutation matrix based upon, at least in part, the one or more parameters extracted for use in the permutation matrix. A final telemetry geometry may be provided for the telemetry system.

One or more of the following example features can be included. The plurality of information associated with the telemetry system can include one or more aviation data containers, phases of flight, data rates for each aviation data container per format, word geometry, input window size time, or combinations thereof. A plurality of frame arrivals can be constructed based upon, at least in part, the plurality of information associated with the telemetry system. Providing the final telemetry geometry for the telemetry system can include performing a multi-classification of the plurality of iterations. The multi-classification of the plurality of iterations can be based upon one or more of a cylindrical region and an elliptical region. Providing the final telemetry geometry for the telemetry system can include down selecting the plurality of iterations. At least a portion of the plurality of information associated with the telemetry system can be optimized, and at least the portion of the plurality of information associated with the telemetry system after optimization can be used as hardware configuration files.

In another example implementation, a computing system can include one or more processors and one or more memories configured to perform operations that can include but are not limited to identifying, by a computing device, a plurality of information associated with a telemetry system. A permutation matrix may be constructed for use with the telemetry system. One or more parameters for use in the permutation matrix may be extracted based upon, at least in part, the plurality of information associated with the telemetry system. A plurality of iterations may be performed with the permutation matrix based upon, at least in part, the one or more parameters extracted for use in the permutation matrix. A final telemetry geometry may be provided for the telemetry system.

One or more of the following example features can be included. The plurality of information associated with the telemetry system can include one or more aviation data containers, phases of flight, data rates for each aviation data container per format, word geometry, input window size time, or combinations thereof. A plurality of frame arrivals can be constructed based upon, at least in part, the plurality of information associated with the telemetry system. Providing the final telemetry geometry for the telemetry system can include performing a multi-classification of the plurality of iterations. The multi-classification of the plurality of iterations can be based upon one or more of a cylindrical region and an elliptical region. Providing the final telemetry geometry for the telemetry system can include down selecting the plurality of iterations. At least a portion of the plurality of information associated with the telemetry system can be optimized, and at least the portion of the plurality of information associated with the telemetry system after optimization can be used as hardware configuration files.

In another example implementation, a computer program product can reside on a computer readable storage medium having a plurality of instructions stored thereon which, when executed across one or more processors, can cause at least a portion of the one or more processors to perform operations that can include but are not limited to identifying, by a computing device, a plurality of information associated with a telemetry system. A permutation matrix may be constructed for use with the telemetry system. One or more parameters for use in the permutation matrix may be extracted based upon, at least in part, the plurality of information associated with the telemetry system. A plurality of iterations may be performed with the permutation matrix based upon, at least in part, the one or more parameters extracted for use in the permutation matrix. A final telemetry geometry may be provided for the telemetry system.

One or more of the following example features can be included. The plurality of information associated with the telemetry system can include one or more aviation data containers, phases of flight, data rates for each aviation data container per format, word geometry, input window size time, or combinations thereof. A plurality of frame arrivals can be constructed based upon, at least in part, the plurality of information associated with the telemetry system. Providing the final telemetry geometry for the telemetry system can include performing a multi-classification of the plurality of iterations. The multi-classification of the plurality of iterations can be based upon one or more of a cylindrical region and an elliptical region. Providing the final telemetry geometry for the telemetry system can include down selecting the plurality of iterations. At least a portion of the plurality of information associated with the telemetry system can be optimized, and at least the portion of the plurality of information associated with the telemetry system after optimization can be used as hardware configuration files.

The details of one or more example implementations are set forth in the accompanying drawings and the description below. Other possible example features and/or possible example advantages will become apparent from the description, the drawings, and the claims. Some implementations can not have those possible example features and/or possible example advantages, and such possible example features and/or possible example advantages can not necessarily be required of some implementations.

BRIEF DESCRIPTION OF THE DRAWINGS

Like reference symbols in the various drawings can indicate like elements.

DESCRIPTION

Figure 1:
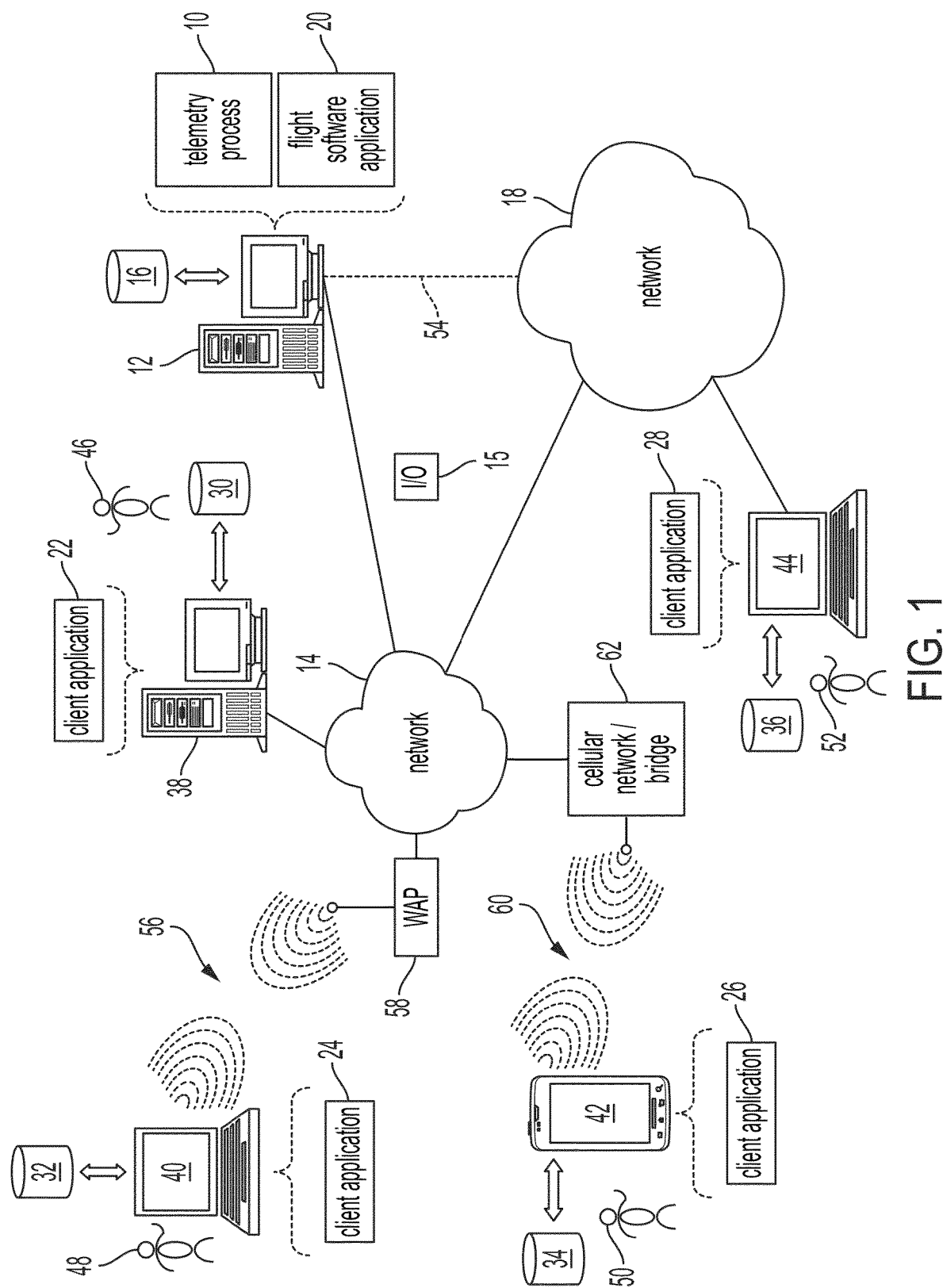
FIG. 1 is an example diagrammatic view of a telemetry process coupled to an example distributed computing network according to one or more example implementations of the disclosure.

Generally, qualification of test data is one of the key parts of validation, which requires a lot of planning, cost and effort. To test and analyze certain systems that are multiplexed together then transmitted to ground, involves creating procedures, releasing documents, labor to install all components, executing tests, analyzing test data, and documenting results, while potentially under aggressive timeline to complete all tasks.

In addition, there can be many permutations of data rates, formats, word size, frame size (e.g., minor frame size), etc. within data containers (e.g., boxes), and if those inputs change, the overall performance after going through the telemetry box (including overall data and overall overhead) needs to be measured each time. To validate, each time there is a change in format, a test has to be performed, which is a significant amount of effort. Moreover, each time a box design changes, the box owner may not know the impact to the overall data and overhead after it is transmitted to the telemetry unit, which can be important in designing an efficient telemetry unit.

Sometimes there are uncertainties about the input geometry (e.g., minor frame word format size, input rate), and there is no availability to test each and every possibility. For example, the geometry by booster may not be given, and only the data rate may be available. As noted above, there are many permutations that could occur only given a data rate, where word size/formats can be of any sizes. Some systems may have good precision in predicting overall data and overhead when all necessary inputs are available. However, when data input or the geometry is not available, many permutations are possible. To validate each permutation, there is change in format, and a test has to be performed, with significant effort.

Therefore, as will be discussed in greater detail below, the present disclosure describes a predictive tool (e.g., a telemetry interactive permutation matrix, or TIPM) that can be utilized for space programs, as well as any system where data is multiplexed together (NASA, DoD, commercial space programs, etc.), which can go through hundreds of permutations and classifies each permutation based on data rate and overhead extracted by an Asynchronous Telemetry Bandwidth Simulator (ATBS) system in minutes. The classifications can narrow down the suited permutations or a single permutation for a design based on the resulted outcome. One of the example elements of TIPM besides the classifier, are the data exchange messages (DEMs), which directly correlates to the input geometry from the avionics data containers.

In some implementations, the present disclosure can be embodied as a method, system, or computer program product. Accordingly, in some implementations, the present disclosure can take the form of an entirely hardware implementation, an entirely software implementation (including firmware, resident software, micro-code, etc.) or an implementation combining software and hardware aspects that can all generally be referred to herein as a "circuit," "module" or "system." Furthermore, in some implementations, the present disclosure can take the form of a computer program product on a computer-usable storage medium having computer-usable program code embodied in the medium.

Software can include artificial intelligence systems, which can include machine learning or other computational intelligence. For example, artificial intelligence (AI) can include one or more models used for one or more problem domains. When presented with many data features, identification of a subset of features that are relevant to a problem domain can improve prediction accuracy, reduce storage space, and increase processing speed. This identification can be referred to as feature engineering. Feature engineering can be performed by users or can only be guided by users. In various implementations, a machine learning system can computationally identify relevant features, such as by performing singular value decomposition on the contributions of different features to outputs.

In some implementations, the various computing devices can include, integrate with, link to, exchange data with, be governed by, take inputs from, and/or provide outputs to one or more AI systems, which can include models, rule-based systems, expert systems, neural networks, deep learning systems, supervised learning systems, robotic process automation systems, natural language processing systems, intelligent agent systems, self-optimizing and self-organizing systems, and others. Except where context specifically indicates otherwise, references to AI, or to one or more examples of AI, should be understood to encompass one or more of these various alternative methods and systems; for example, without limitation, an AI system described for enabling any of a wide variety of functions, capabilities and solutions described herein (such as optimization, autonomous operation, prediction, control, orchestration, or the like) should be understood to be capable of implementation by operation on a model or rule set; by training on a training data set of human tag, labels, or the like; by training on a training data set of human interactions (e.g., human interactions with software interfaces or hardware systems); by training on a training data set of outcomes; by training on an AI-generated training data set (e.g., where a full training data set is generated by AI from a seed training data set); by supervised learning; by semi-supervised learning; by deep learning; or the like. For any given function or capability that is described herein, neural networks of various types can be used, including any of the types described herein, and in embodiments a hybrid set of neural networks can be selected such that within the set a neural network type that is more favorable for performing each element of a multi-function or multi-capability system or method is implemented. As one example among many, a deep learning, or black box, system can use a gated recurrent neural network for a function like language translation for an intelligent agent, where the underlying mechanisms of AI operation need not be understood as long as outcomes are favorably perceived by users, while a more transparent model or system and a simpler neural network can be used for a system for automated governance, where a greater understanding of how inputs are translated to outputs can be needed to comply with regulations or policies.

Examples of the models include recurrent neural networks (RNNs) such as long short-term memory (LSTM), deep learning models such as transformers, decision trees, support-vector machines, genetic algorithms, Bayesian networks, and regression analysis. Examples of systems based on a transformer model include bidirectional encoder representations from transformers (BERT) and generative pre-trained transformers (GPT). Training a machine-learning model can include supervised learning (for example, based on labelled input data), unsupervised learning, and reinforcement learning. In various embodiments, a machine-learning model can be pre-trained by their operator or by a third party. Problem domains include nearly any situation where structured data can be collected, and includes natural language processing (NLP), computer vision (CV), classification, image recognition, etc. Some or all of the software can run in a virtual environment rather than directly on hardware. The virtual environment can include a hypervisor, emulator, sandbox, container engine, etc. The software can be built as a virtual machine, a container, etc. Virtualized resources can be controlled using, for example, a DOCKER container platform, a pivotal cloud foundry (PCF) platform, etc. Some or all of the software can be logically partitioned into microservices. Each microservice offers a reduced subset of functionality. In various embodiments, each microservice can be scaled independently depending on load, either by devoting more resources to the microservice or by instantiating more instances of the microservice. In various embodiments, functionality offered by one or more microservices can be combined with each other and/or with other software not adhering to a microservices model.

In some implementations, any suitable computer usable or computer readable medium (or media) can be utilized. The computer readable medium can be a computer readable signal medium or a computer readable storage medium. The computer-usable, or computer-readable, storage medium (including a storage device associated with a computing device or client electronic device) can be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium or storage device can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, solid state drives (SSDs), a digital versatile disk (DVD), a Blu-ray disc, and an Ultra HD Blu-ray disc, a static random access memory (SRAM), dynamic RAM (DRAM), synchronous DRAM (SDRAM), synchronous graphics RAM (SGRAM), and video RAM (VRAM), analog magnetic tape, digital magnetic tape, rotating hard disk drive (HDDs), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium can be any tangible medium that can contain or store a program for use by or in connection with the instruction execution system, apparatus, or device.

Examples of storage implemented by the storage hardware include a distributed ledger, such as a permissioned or permissionless blockchain. Entities recording transactions, such as in a blockchain, can reach consensus using an algorithm such as proof-of-stake, proof-of-work, and proof-of-storage. Elements of the present disclosure can be represented by or encoded as non-fungible tokens (NFTs). Ownership rights related to the non-fungible tokens can be recorded in or referenced by a distributed ledger. Transactions initiated by or relevant to the present disclosure can use one or both of fiat currency and cryptocurrencies, examples of which include bitcoin and ether.

In some implementations, a computer readable signal medium can include a propagated data signal with computer readable program code embodied therein, for example, in baseband or as part of a carrier wave. In some implementations, such a propagated signal can take any of a variety of forms, including, but not limited to, electromagnetic, optical, or any suitable combination thereof. In some implementations, the computer readable program code can be transmitted using any appropriate medium, including but not limited to the internet, wireline, optical fiber cable, RF, etc. In some implementations, a computer readable signal medium can be any computer readable medium that is not a computer readable storage medium and that can communicate, propagate, or transport a program for use by or in connection with an instruction execution system, apparatus, or device.

In some implementations, computer program code for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure can also be written in conventional procedural programming languages, such as the "C" programming language, PASCAL, or similar programming languages, as well as in scripting languages such as JavaScript, PERL, or Python. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through a network, such as a cellular network, local area network (LAN), a wide area network (WAN), a body area network BAN), a personal area network (PAN), a metropolitan area network (MAN), etc., or the connection can be made to an external computer (for example, through the internet using an Internet Service Provider). The networks can include one or more of point-to-point and mesh technologies. Data transmitted or received by the networking components can traverse the same or different networks. Networks can be connected to each other over a WAN or point-to-point leased lines using technologies such as Multiprotocol Label Switching (MPLS) and virtual private networks (VPNs), etc. In some implementations, electronic circuitry including, for example, programmable logic circuitry, an application specific integrated circuit (ASIC), gate arrays such as field-programmable gate arrays (FPGAs) or other hardware accelerators, micro-controller units (MCUs), or programmable logic arrays (PLAs), integrated circuits (ICs), digital circuit elements, analog circuit elements, combinational logic circuits, digital signal processors (DSPs), complex programmable logic devices (CPLDs), etc. can execute the computer readable program instructions/code by utilizing state information of the computer readable program instructions to personalize the electronic circuitry, in order to perform aspects of the present disclosure. Multiple components of the hardware can be integrated, such as on a single die, in a single package, or on a single printed circuit board or logic board. For example, multiple components of the hardware can be implemented as a system-on-chip. A component, or a set of integrated components, can be referred to as a chip, chipset, chiplet, or chip stack. Examples of a system-on-chip include a radio frequency (RF) system-on-chip, an artificial intelligence (AI) system-on-chip, a video processing system-on-chip, an organ-on-chip, a quantum algorithm system-on-chip, etc.

Examples of processing hardware can include a central processing unit (CPU), a graphics processing unit (GPU), an approximate computing processor, a quantum computing processor, a parallel computing processor, a neural network processor, a signal processor, a digital processor, a data processor, an embedded processor, a microprocessor, and a co-processor. The co-processor can provide additional processing functions and/or optimizations, such as for speed or power consumption. Examples of a co-processor include a math co-processor, a graphics co-processor, a communication co-processor, a video co-processor, and an artificial intelligence (AI) co-processor.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, can represent a module, segment, or portion of code, which comprises one or more executable computer program instructions for implementing the specified logical function(s)/act(s). These computer program instructions can be provided to a processor of a general purpose computer, special purpose computer, or other programmable data processing apparatus to produce a machine, such that the computer program instructions, which can execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) can occur out of the order noted in the figures (or combined or omitted). For example, two blocks shown in succession can, in fact, be executed substantially concurrently, or the blocks can sometimes be executed in the reverse order, depending upon the functionality involved.

In some implementations, these computer program instructions can also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions can also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown telemetry process 10 that can reside on and can be executed by a computer (e.g., computer 12), which can be connected to a network (e.g., network 14) (e.g., the internet or a local area network). Examples of computer 12 (and/or one or more of the client electronic devices noted below) can include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). A SAN can include one or more of the client electronic devices, including a RAID device and a NAS system. In some implementations, each of the aforementioned can be generally described as a computing device. In certain implementations, a computing device can be a physical or virtual device. In many implementations, a computing device can be any device capable of performing operations, such as a dedicated processor, a portion of a processor, a virtual processor, a portion of a virtual processor, portion of a virtual device, or a virtual device. In some implementations, a processor can be a physical processor or a virtual processor. In some implementations, a virtual processor can correspond to one or more parts of one or more physical processors. In some implementations, the instructions/logic can be distributed and executed across one or more processors, virtual or physical, to execute the instructions/logic. Computer 12 can execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a telemetry process, such as telemetry process 10 of FIG. 1, can identify, by a computing device, a plurality of information associated with a telemetry system. A permutation matrix may be constructed for use with the telemetry system. One or more parameters for use in the permutation matrix may be extracted based upon, at least in part, the plurality of information associated with the telemetry system. A plurality of iterations may be performed with the permutation matrix based upon, at least in part, the one or more parameters extracted for use in the permutation matrix. A final telemetry geometry may be provided for the telemetry system.

In some implementations, the instruction sets and subroutines of telemetry process 10, which can be stored on storage device, such as storage device 16, coupled to computer 12, can be executed by one or more processors and one or more memory architectures included within computer 12. In some implementations, storage device 16 can include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 can be organized as an extent, an extent pool, a RAID extent (e.g., an example 4D+1P R5, where the RAID extent can include, e.g., five storage device extents that can be allocated from, e.g., five different storage devices), a mapped RAID (e.g., a collection of RAID extents), or combination thereof.

In some implementations, network 14 can be connected to one or more secondary networks (e.g., network 18), examples of which can include but are not limited to: a local area network; a wide area network or other telecommunications network facility; or an intranet, for example. The phrase "telecommunications network facility," as used herein, can refer to a facility configured to transmit, and/or receive transmissions to/from one or more mobile client electronic devices (e.g., cellphones, etc.) as well as many others.

In some implementations, computer 12 can include a data store, such as a database (e.g., relational database, object-oriented database, triplestore database, etc.), a data store, a data lake, a column store, and/or a data warehouse, and can be located within any suitable memory location, such as storage device 16 coupled to computer 12. In some implementations, data, metadata, information, etc. described throughout the present disclosure can be stored in the data store. In some implementations, computer 12 can utilize any known database management system such as, but not limited to, DB2, in order to provide multi-user access to one or more databases, such as the above noted relational database. In some implementations, the data store can also be a custom database, such as, for example, a flat file database or an XML database. In some implementations, any other form(s) of a data storage structure and/or organization can also be used. In some implementations, telemetry process 10 can be a component of the data store, a standalone application that interfaces with the above noted data store and/or an applet/application that is accessed via client applications 22, 24, 26, 28. In some implementations, the above noted data store can be, in whole or in part, distributed in a cloud computing topology. In this way, computer 12 and storage device 16 can refer to multiple devices, which can also be distributed throughout the network.

In some implementations, computer 12 can execute a flight software application (e.g., flight software application 20). In some implementations, telemetry process 10 and/or flight software application 20 can be accessed via one or more of client applications 22, 24, 26, 28. In some implementations, telemetry process 10 can be a standalone application, or can be an applet/application/script/extension that can interact with and/or be executed within flight software application 20, a component of flight software application 20, and/or one or more of client applications 22, 24, 26, 28. In some implementations, flight software application 20 can be a standalone application, or can be an applet/application/script/extension that can interact with and/or be executed within telemetry process 10, a component of telemetry process 10, and/or one or more of client applications 22, 24, 26, 28. In some implementations, one or more of client applications 22, 24, 26, 28 can be a standalone application, or can be an applet/application/script/extension that can interact with and/or be executed within and/or be a component of telemetry process 10 and/or flight software application 20. Examples of client applications 22, 24, 26, 28 can include, but are not limited to, e.g., a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which can be stored on storage devices 30, 32, 34, 36, coupled to client electronic devices 38, 40, 42, 44, can be executed by one or more processors and one or more memory architectures incorporated into client electronic devices 38, 40, 42, 44.

In some implementations, one or more of storage devices 30, 32, 34, 36, can include but are not limited to: hard disk drives; flash drives, tape drives; optical drives; RAID arrays; random access memories (RAM); and read-only memories (ROM). Examples of client electronic devices 38, 40, 42, 44 (and/or computer 12) can include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., audio/video, photo, etc.) capturing and/or output device, an audio input and/or recording device (e.g., a handheld microphone, a lapel microphone, an embedded microphone (such as those embedded within eyeglasses, smart phones, tablet computers and/or watches, etc.), and a dedicated network device. Client electronic devices 38, 40, 42, 44 can each execute an operating system, examples of which can include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 can be configured to effectuate some or all of the functionality of telemetry process 10 (and vice versa). Accordingly, in some implementations, telemetry process 10 can be a purely server-side application, a purely client-side application, or a hybrid server-side/client-side application that is cooperatively executed by one or more of client applications 22, 24, 26, 28 and/or telemetry process 10.

In some implementations, one or more of client applications 22, 24, 26, 28 can be configured to effectuate some or all of the functionality of flight software application 20 (and vice versa). Accordingly, in some implementations, flight software application 20 can be a purely server-side application, a purely client-side application, or a hybrid server-side/client-side application that is cooperatively executed by one or more of client applications 22, 24, 26, 28 and/or flight software application 20. As one or more of client applications 22, 24, 26, 28, telemetry process 10, and flight software application 20, taken singly or in any combination, can effectuate some or all of the same functionality, any description of effectuating such functionality via one or more of client applications 22, 24, 26, 28, telemetry process 10, flight software application 20, or combination thereof, and any described interaction(s) between one or more of client applications 22, 24, 26, 28, telemetry process 10, flight software application 20, or combination thereof to effectuate such functionality, should be taken as an example only and not to limit the scope of the disclosure.

In some implementations, one or more of users 46, 48, 50, 52 can access computer 12 and telemetry process 10 (e.g., using one or more of client electronic devices 38, 40, 42, 44) directly through network 14 or through secondary network 18. Further, computer 12 can be connected to network 14 through secondary network 18, as illustrated with phantom link line 54. Telemetry process 10 can include one or more user interfaces, such as browsers and textual or graphical user interfaces, through which users 46, 48, 50, 52 can access telemetry process 10.

In some implementations, the various client electronic devices can be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 can be, for example, an IEEE 802.11a, 802.11b, 802.11g, 802.11n, 802.11ac, Wi-Fi®, RFID, and/or Bluetooth™ (including Bluetooth™ Low Energy) or any device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications can use Ethernet protocol and carrier sense multiple access with collision avoidance (i.e., CSMA/CA) for path sharing. The various 802.11x specifications can use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) can also be used. In some implementations, computer 12 can be directed or controlled by an operator. Computer 12 can be hosted by one or more of assets owned by the operator, assets leased by the operator, and third-party assets. The assets can be referred to as a private, community, or hybrid cloud computing network or cloud computing environment. For example, computer 12 can be partially or fully hosted by a third party offering software as a service (SaaS), platform as a service (PaaS), and/or infrastructure as a service (IaaS). Computer 12 can be implemented using agile development and operations (DevOps) principles. In some implementations, some or all of computer 12 can be implemented in a multiple-environment architecture. For example, the multiple environments can include one or more production environments, one or more integration environments, one or more development environments, etc.

In some implementations, various I/O requests (e.g., I/O request 15) can be sent from, e.g., client applications 22, 24, 26, 28 to, e.g., computer 12 (and vice versa). Examples of I/O request 15 can include but are not limited to, data write requests (e.g., a request that content be written to computer 12) and data read requests (e.g., a request that content be read from computer 12).

Figure 2:
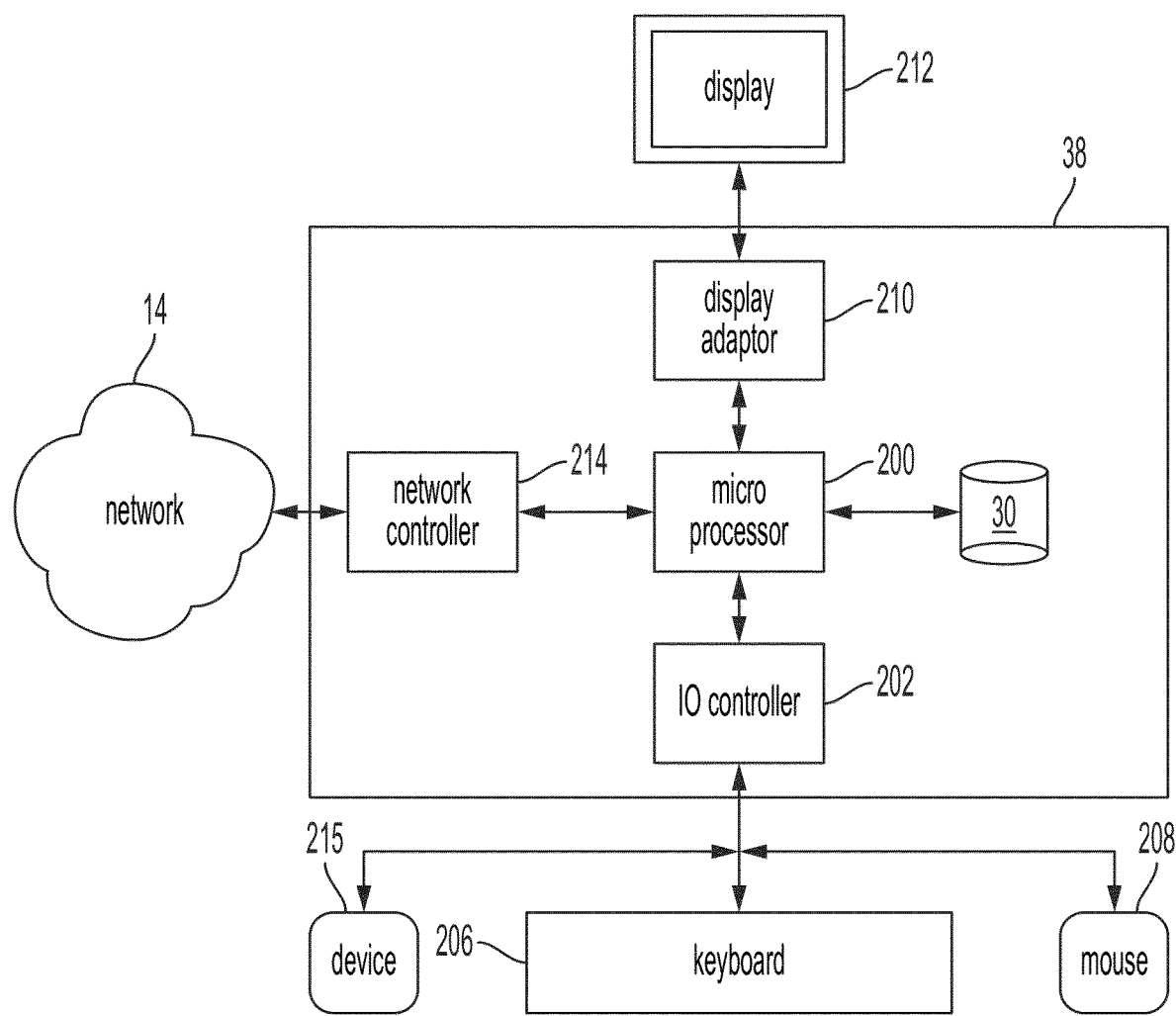
FIG. 2 is an example diagrammatic view of a client electronic device of FIG. 1 according to one or more example implementations of the disclosure.

Referring also to the example implementation of FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, telemetry process 10 can be substituted for client electronic device 38 (in whole or in part) within FIG. 2, examples of which can include but are not limited to computer 12 and/or one or more of client electronic devices 38, 40, 42, 44.

In some implementations, client electronic device 38 can include a processor (e.g., microprocessor 200) configured to, e.g., process data and execute the above-noted code/instruction sets and subroutines. Microprocessor 200 can be coupled via a storage adaptor to the above-noted storage device(s) (e.g., storage device 30). An I/O controller (e.g., I/O controller 202) can be configured to couple microprocessor 200 with various devices (e.g., via wired or wireless connection), such as keyboard 206, pointing/selecting device (e.g., touchpad, touchscreen, mouse 208, etc.), custom device (e.g., device 215), USB ports, and printer ports. A display adaptor (e.g., display adaptor 210) can be configured to couple display 212 (e.g., touchscreen monitor(s), plasma, CRT, or LCD monitor(s), etc.) with microprocessor 200, while network controller/adaptor 214 (e.g., an Ethernet adaptor) can be configured to couple microprocessor 200 to the above-noted network 14 (e.g., the Internet or a local area network).

As will be discussed below, telemetry process 10 can at least help, e.g., improve data flight (or other) simulation technology, necessarily rooted in computer technology in order to overcome an example and non-limiting problem specifically arising in the realm of computer processing and to improve existing technological processes associated with, e.g., telemetry systems, etc. It will be appreciated that the computer processes described throughout are integrated into one or more practical applications, and when taken at least as a whole are not considered to be well-understood, routine, and conventional functions.

Figure 3:
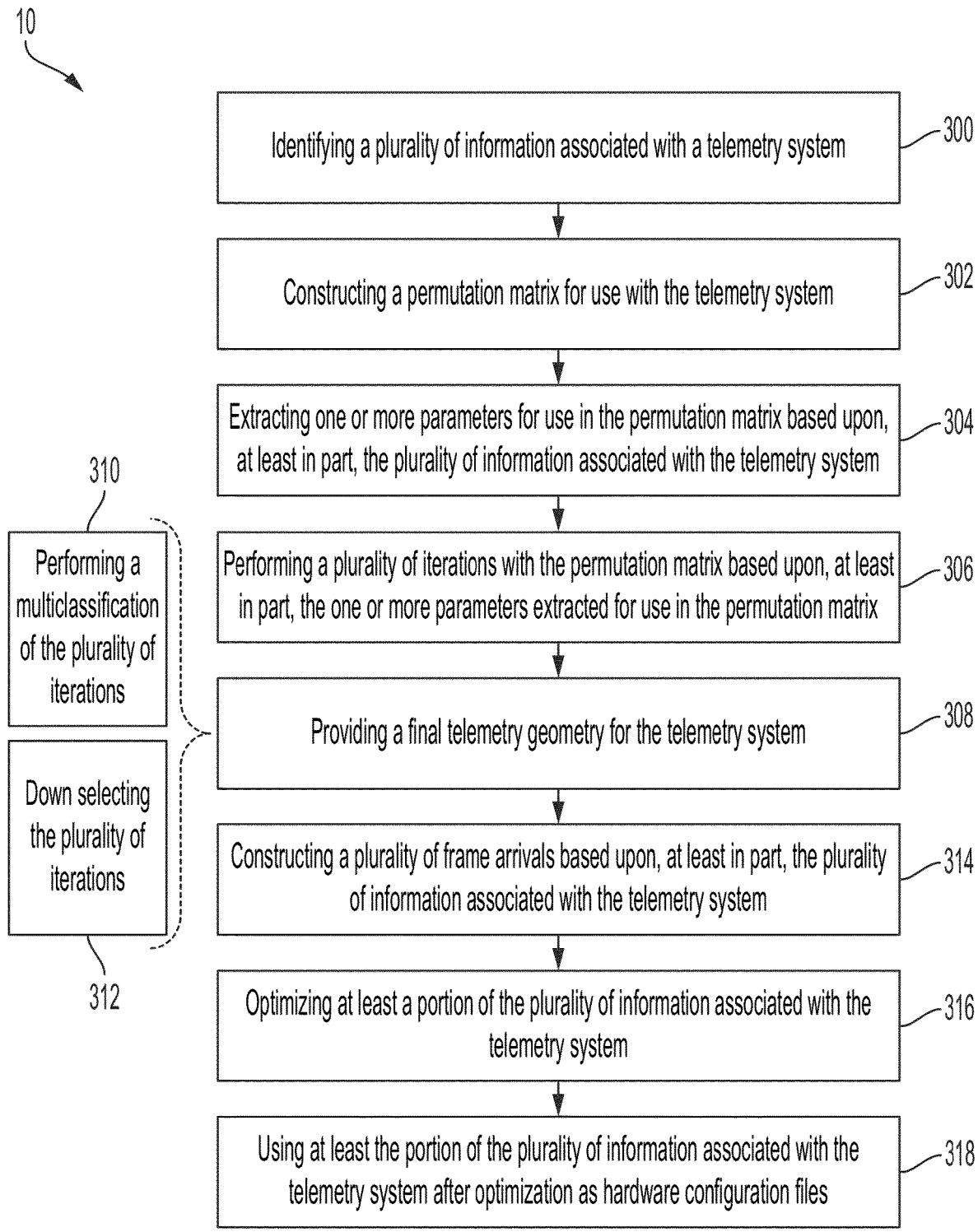
FIG. 3 is an example flowchart of a telemetry process according to one or more example implementations of the disclosure.

As discussed above and referring also at least to the example implementations of FIG. 3, telemetry process 10 can identify 300, by a computing device, a plurality of information associated with a telemetry system. Telemetry process 10 can construct 302 a permutation matrix for use with the telemetry system. Telemetry process 10 can extract 304 one or more parameters for use in the permutation matrix based upon, at least in part, the plurality of information associated with the telemetry system. Telemetry process 10 can perform 306 a plurality of iterations with the permutation matrix based upon, at least in part, the one or more parameters extracted for use in the permutation matrix. Telemetry process 10 can provide 308 a final telemetry geometry for the telemetry system.

Figure 4:
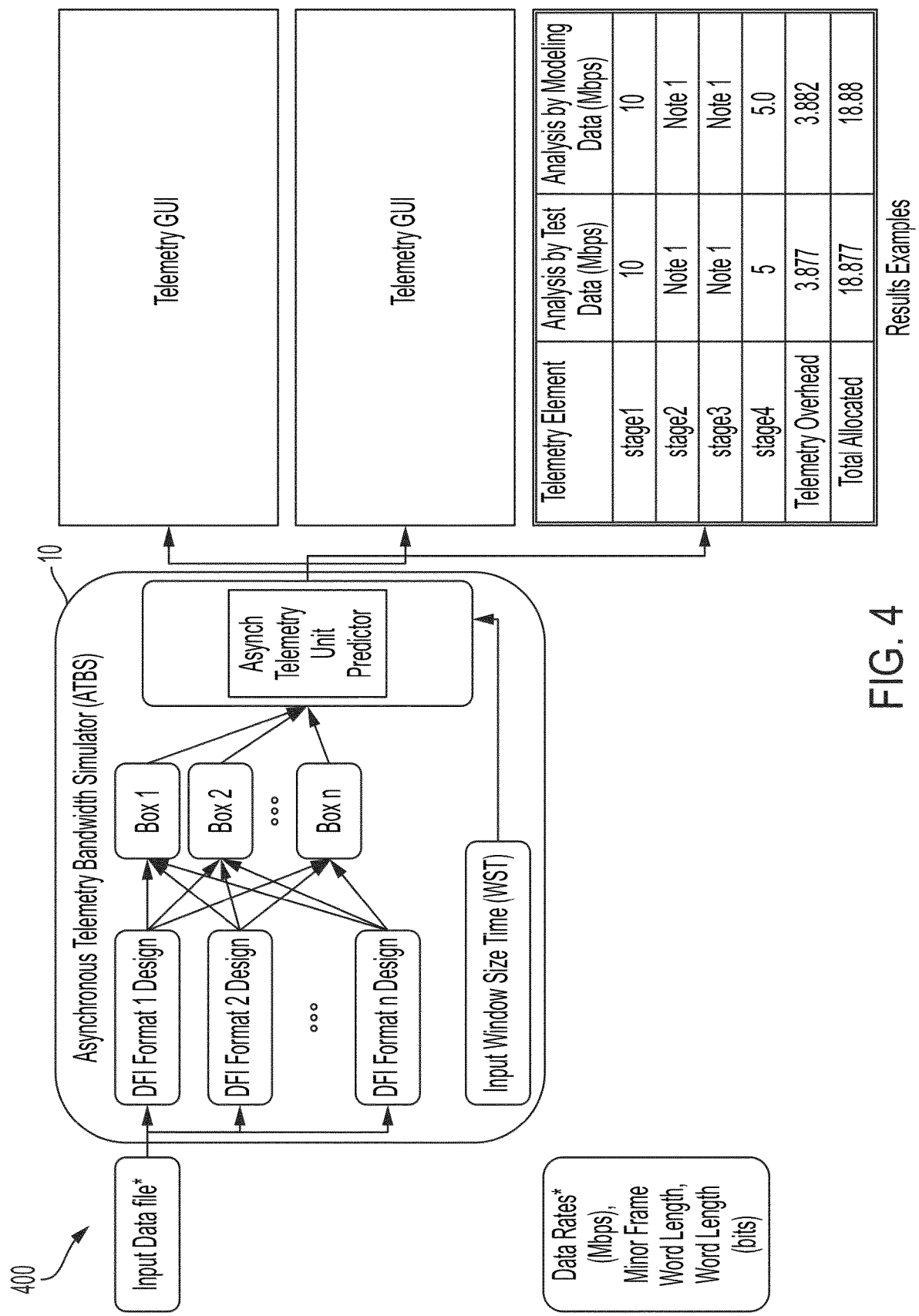
FIG. 4 is an example diagrammatic view of an asynchronous telemetry bandwidth simulator of a telemetry process according to one or more example implementations of the disclosure.
Figure 5:
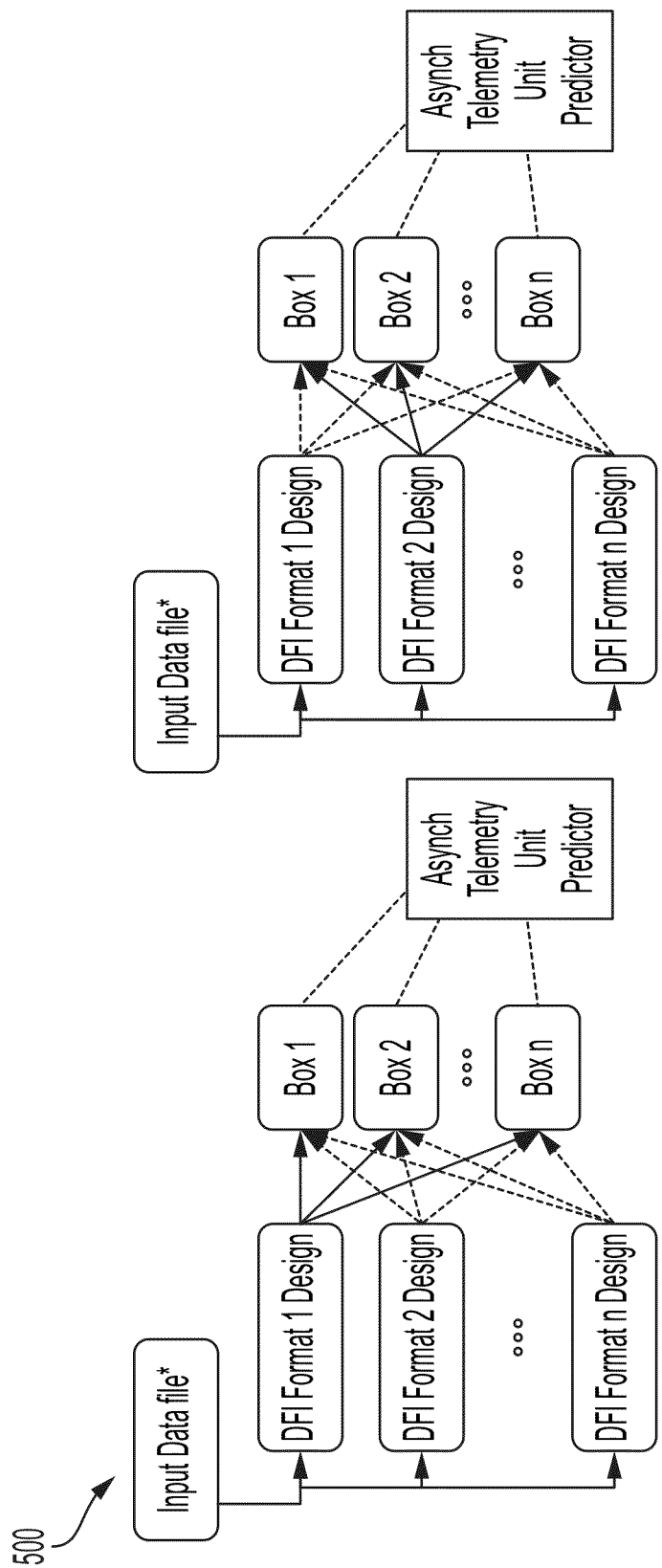
FIG. 5 is an example diagrammatic view of an asynchronous telemetry bandwidth simulator of a telemetry process according to one or more example implementations of the disclosure.

In some implementations, telemetry process 10 can identify 300, by a computing device, a plurality of information associated with a telemetry system. For instance, and referring at least to the example implementations of FIGS. 4-5, an example system 400 and system 500 are shown. In some implementations, the plurality of information associated with the telemetry system can include one or more aviation data containers (e.g., boxes), phases of flight (e.g., launch, booster separation, communication format switches, core stage separation, cores stage impact, etc.), data rates for each aviation data container per format (e.g., each having a bandwidth in, for example, megabytes per second), word geometry (e.g., minor frame word length, and word length), input window size time (WST) (e.g., telemetry process 10's telemetry unit processing time t (e.g., 20 ms), etc., or combinations thereof.

Figure 6:
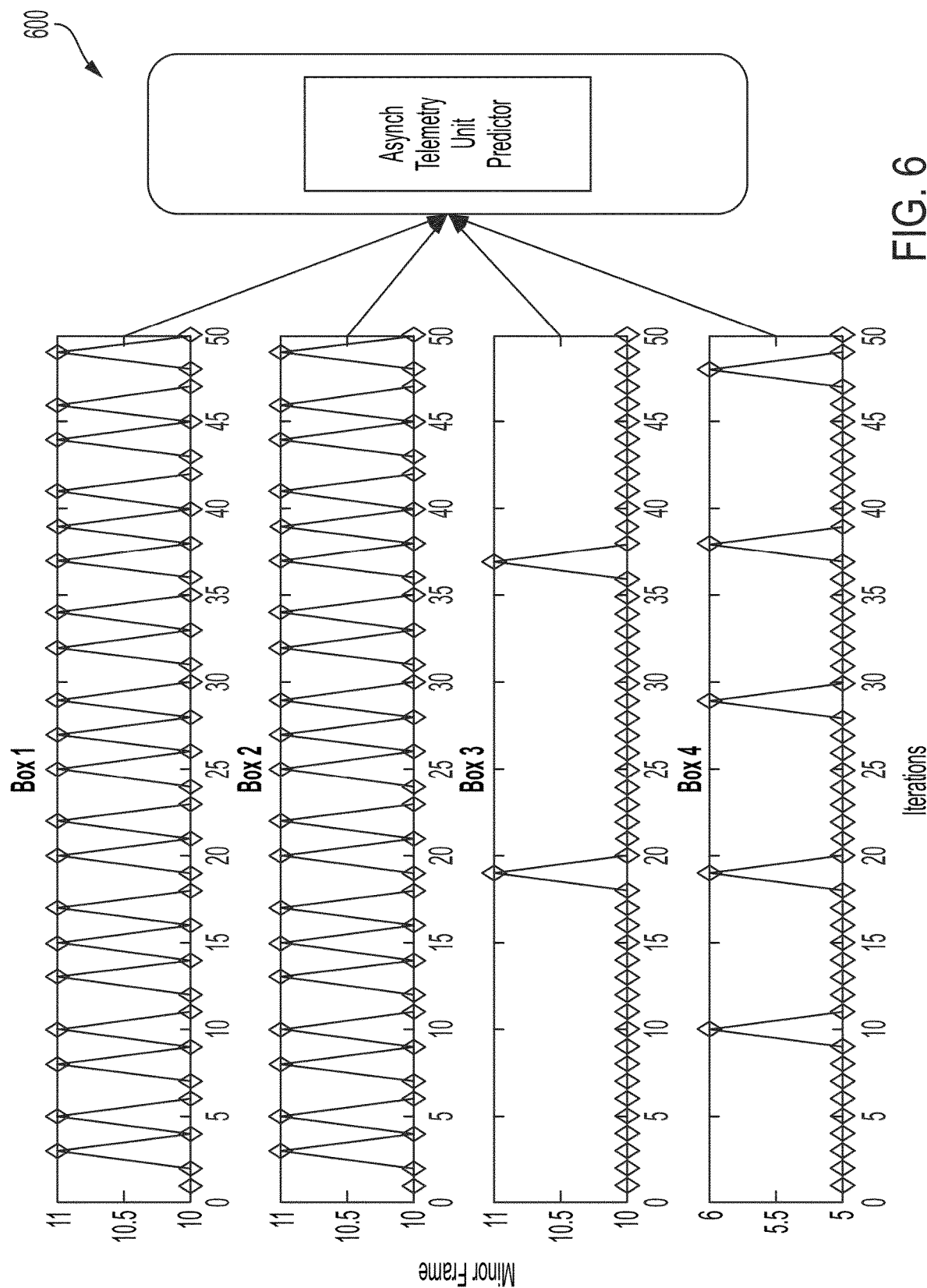
FIG. 6 is an example diagrammatic view of aviation data container iterations performed by a telemetry process according to one or more example implementations of the disclosure.

In some implementations, telemetry process 10 can construct 314 a plurality of (e.g., minor) frame arrivals based upon, at least in part, the plurality of information associated with the telemetry system (e.g., a flight simulation, although a simulation is not required and any telemetry system, including live telemetry systems, may be used), where, in some implementations, each minor frame arrival of the plurality of minor frame arrivals can be constructed per input window size time. For instance, and referring at least to the example implementation of FIG. 6, example iterations 600 of each aviation data container is shown. Upon receiving (or otherwise identifying or obtaining) the data rates, word geometry, and formats, telemetry process 10 may (e.g., via an asynchronous function) construct a minor frame arrival per each WST. The construction of the minor frame arrival is a time allotted window where transmitted data can be processed. As an example, one minor frame is the minor frame word size times the word length (e.g., 800×12=9600). The system may model how many of the minor frames will arrive per WST based on their data rates.

In some implementations, telemetry process 10 can determine that one of the plurality of minor frame arrivals does not entirely fit in an input window size time, and telemetry process 10 can send the one of the plurality of minor frame arrivals that does not entirely fit in the input window size time in a next input window size time. For instance, assume for example purposes only that telemetry process 10 (e.g., via a telemetry unit) only processes per whole number of minor frames. Thus, in the example, if telemetry process 10 (e.g., via the telemetry unit) cannot fit the entire minor frame in that window, telemetry process 10 can send it in the next window. For example, if there are 10.4 frames per 20 ms WST, telemetry process 10 (in some examples) can only send 10 frames in the current window, following the same data rate, the next window will have 10.8 frames (10.4 new arrival+0.4), thereby, telemetry process 10 can still send 10 frames in the following window. The next window can have 11.2 frames (10.4+0.8), and as a result, telemetry process 10 can send 11 frames. Therefore, the number of minor frames per telemetry unit is not necessarily constant and it can vary, which can complicate simulations and make them prone to large error rates.

In some implementations, telemetry process 10 can packetize the plurality of minor frame arrivals into a plurality of data packets. For instance, after receiving the number of minor frames per window, telemetry process 10 can multiply it by the size of the minor frame, and can packetize it based on any relevant protocols and coding (e.g., CCSDS protocols and LDPC coding). For example, assume for box 1 that each minor frame is 12 bits*800 words=9,600 bits. If there are 10 minor frames, then 96,000 bits of data needs to packetized using the CCSDS packet formats. In the example, each minor frame can attach an extra message identifier header of, e.g., 20 bytes. Starting of ENCAP can have an extra, e.g., 32 bits. After aggregating the message identifier header, the minor frame data, and ENCAP, telemetry process 10 can divide the total by packet length (e.g., using ⅞ LDPC coding, with the length of each packet being 7072 bits). In some implementations, telemetry process 10 can add various overheads per specific protocol (e.g., ASM, TF header, MPDU header, and LDPC for a CCSDS protocol) coding parity filled with zero bits to the packet. In some implementations, telemetry process 10 can use filled data after data ends in the last packet and the next data type starts in the new Encapsulation CCSDS packet. Generally, filled data may be described as idle pattern information (e.g., AEAEAEAE . . . ), which can fill the remainder of the packet. In some implementations, telemetry process 10 may consider filled data as part of the overhead.

In some implementations, telemetry process 10 can multiplex the plurality of data packets to generate multiplexed data packets. For instance, the above process can be repeated for all the avionics boxes with different data rates, minor frame geometry, etc.

In some implementations, telemetry process 10 can predict a total amount of bandwidth needed for the telemetry system based upon, at least in part, the multiplexed data packets. For instance, in some implementations, the total amount of bandwidth needed for the telemetry system can include an overall raw data, an overall data, an overhead data, a filled data, or combinations thereof. For instance, for the overall raw data (e.g., excluding message identifier header), telemetry process 10 can predict all the raw data and break them down into different type of data (e.g., CS data, booster data, etc.). Overall data may generally be all the data, including all the overhead mentioned above. Overhead data may include the CCSDS overhead, including message identifier header and ENCAP header, and filled data. Filled data can be used to fill the rest of the packet and can be included in the overall overhead.

In some implementations, telemetry process 10 can predict an amount of available bandwidth for the telemetry system. For instance, margin or IDLE packet may be generally described as the remaining empty packets from the RF bandwidth. As such, telemetry process 10 can predict how much remining data is available for the entire mission and per phase of flight.

Thus, telemetry process 10 may be used as a predictive tool (e.g., an asynchronous telemetry bandwidth simulator) that can be designed for space programs, as well as any system where data is multiplexed together (NASA, DoD, commercial space programs, etc.). Some systems can consist of several avionics "boxes" that transmit data with different data rates to the telemetry unit, where the telemetry unit can then multiplex the data, packetize the data, and add overhead using forward error corrections overhead (e.g., CCSDS with ⅞ LDPC coding or other space application protocol format). The packetized data can then be transmitted to a radio frequency (RF) transmitter to be transmitted to the ground during the SLS CS mission. The telemetry box can also be in an asynchronous system that can operate on a specific time window that only transmits whole minor frames from each time window, which implies that not every window has the same amount of raw data.

In some implementations, telemetry process 10 may predict within +/−0.025% of the overall data, overhead, fill data, CCSDS data, and IDLE packets/margin. Telemetry process 10 can provide critical support for testing activities if components were to fail or not be available at the overall bandwidth, and component bandwidth can still be modeled accurately without sacrificing schedule or rerunning the test. In some implementations, telemetry process 10 may help reduce cost per vehicle, eliminate risks and save testing schedules. In some implementations, telemetry process 10 may not only allow users to run specific requested formats, but can run hundreds of permutations within minutes, analyze the results, and recommend/classify permutations based on overall performance.

In some implementations, telemetry process 10 may optimize 316 at least a portion of the plurality of information associated with the telemetry system, and at least the portion of the plurality of information associated with the telemetry system after optimization may be used 318 by telemetry process 10 as hardware configuration files. For instance, and referring to the example implementation of FIG. 7, an example alternative view of a flowchart of telemetry process 10 is shown. In step 1, the configuration of each box (aviation data container as discussed above), is established by telemetry process 10 as discussed above (shown also in step e.). In step 2, programmed data rates and geometry may be telemetered by each box (e.g., via telemetry process 10). In step 3, a telemetry unit (e.g., via telemetry process 10) multiplexes all telemetry from each box and sends to the RF Transmitter. In step 4, data is transmitted (e.g., via telemetry process 10) to the ground. In step 5, data is decoded and analyzed (e.g., via telemetry process 10) for overall bandwidth results for the whole system.

In step a., data rates and geometries are inputted into, e.g., telemetry process 10. In step b., telemetry process 10 produces the overall bandwidth of the system. In step c., the bandwidth result is compared by telemetry process 10 to the requirement. In step d., if bandwidth fails to meet the requirements, new data rates/geometries are updated/optimized by telemetry process 10 to be inputted back into telemetry process 10. By optimizing, overhead is reduced and actual data being sent in the same allocated RF bandwidth is increased. In step e., if bandwidth meets the requirements, the box programming is good for use in operation.

As noted above, sometimes there are uncertainties about the input geometry (e.g., minor frame word format size, input rate), and there is no availability to test each and every possibility. For example, the geometry by booster may not be given, and only the data rate may be available. As noted above, there are many permutations that could occur only given a data rate, where word size/formats can be of any sizes. Some systems may have good precision in predicting overall data and overhead when all necessary inputs are available. However, when data input or the geometry is not available, many permutations are possible. To validate each permutation, there is change in format, and a test has to be performed, with significant effort.

The classifications can narrow down the suited permutations or a single permutation for a design based on the resulted outcome.

Figure 8A:
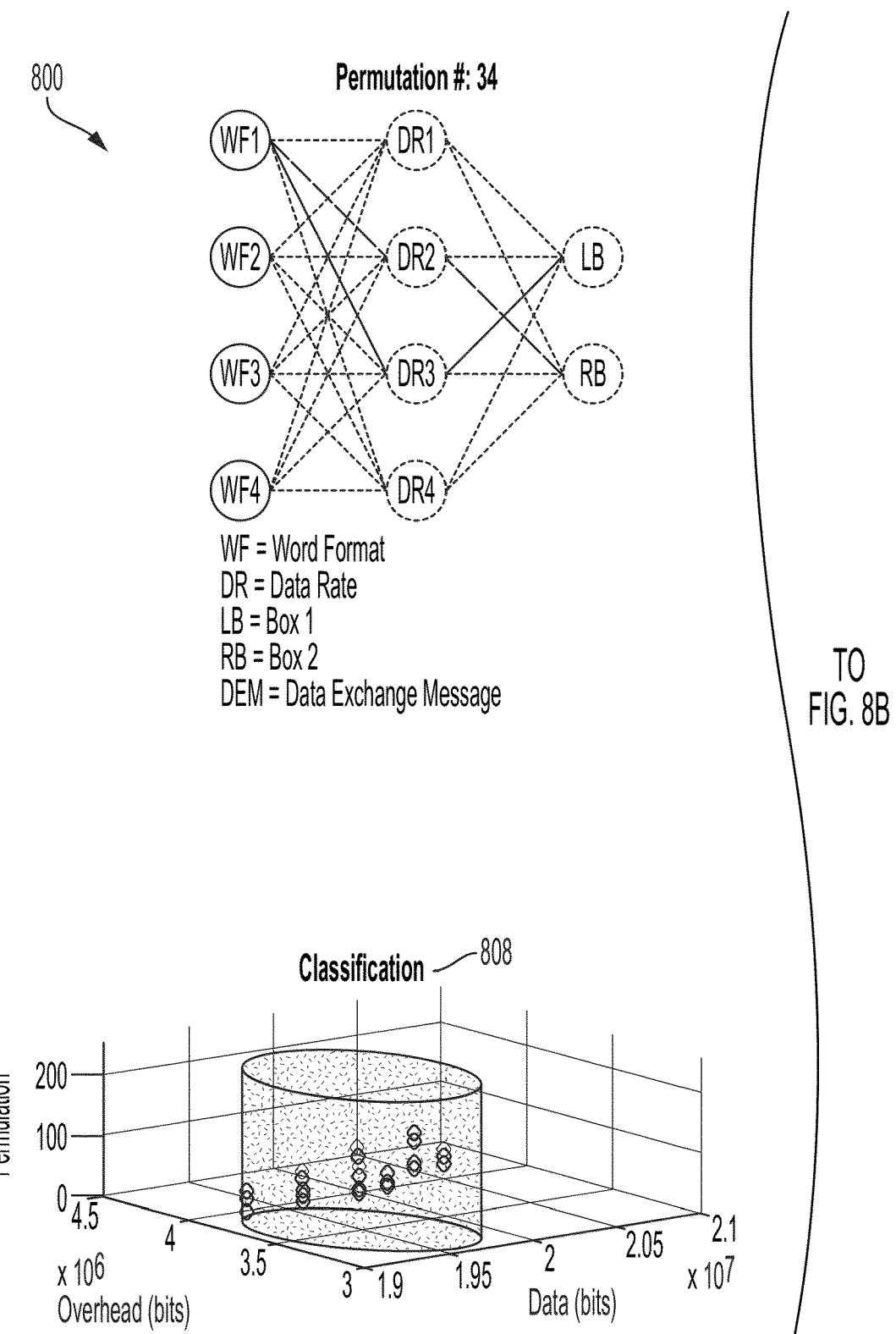
FIG. 8A and FIG. 8B are example diagrammatic views of a permutation and resulting data points performed by a telemetry process according to one or more example implementations of the disclosure.
Figure 8B:
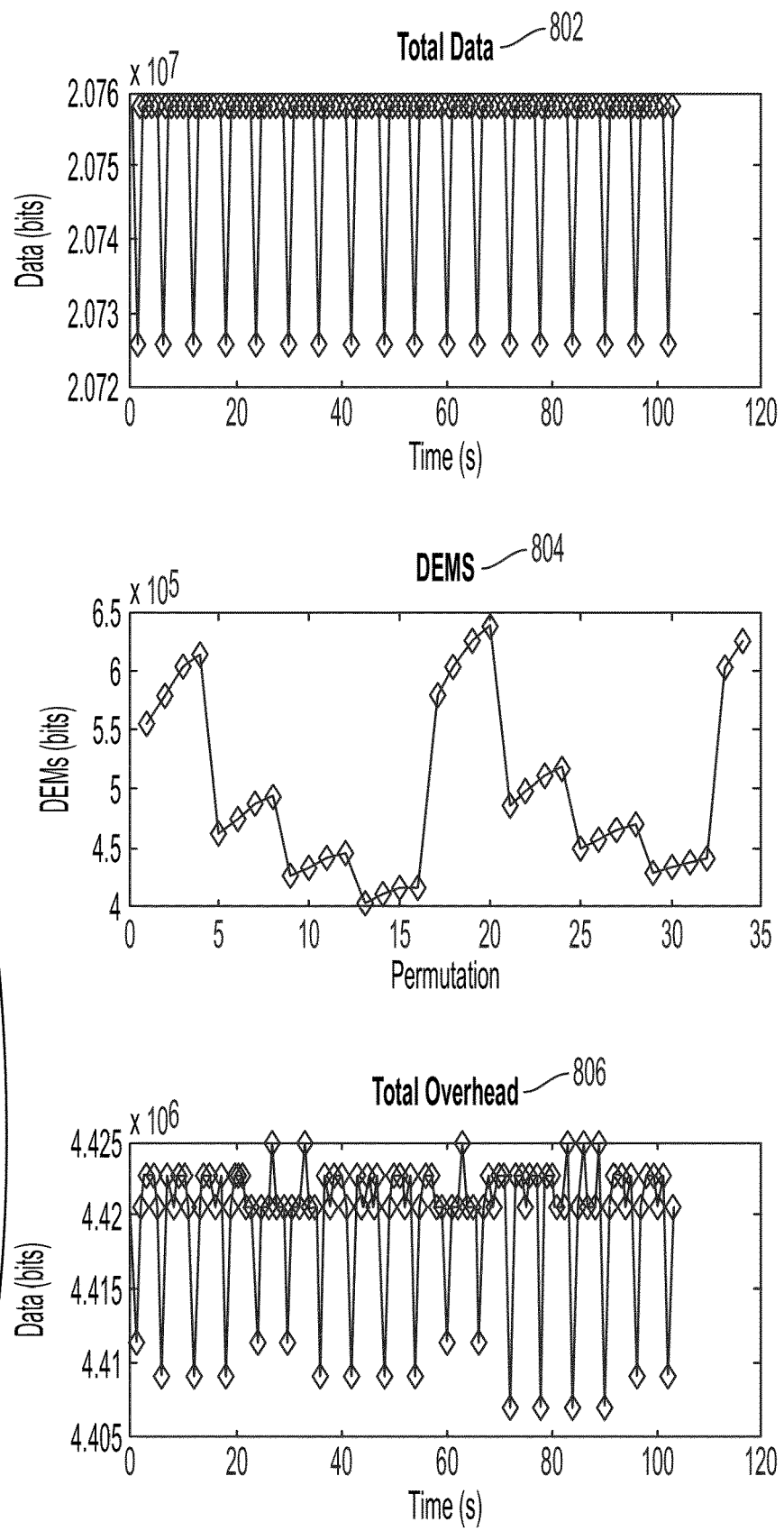

In some implementations, telemetry process 10 can construct 302 a permutation matrix for use with the telemetry system. For instance, to address the above-noted example and non-limiting issue, telemetry process 10 may be used as a predictive tool (e.g., a telemetry interactive permutation matrix, or TIPM) that can be utilized for telemetry systems, which can go through hundreds of permutations and classifies each permutation based on data rate and overhead extracted by the above-noted ATBS system of telemetry process 10 in minutes or even seconds depending on processing resources. Referring at least to the example implementation of FIG. 8, an example permutation matrix (e.g., permutation matrix 800) is shown. In the example, permutation matrix 800 could involve, e.g., WF1 to DR2 to RB as one permutation in permutation matrix 800, WF1 to DR3 to LB as one permutation in permutation matrix 800, etc, etc.

In some implementations, telemetry process 10 can extract 304 one or more parameters for use in the permutation matrix based upon, at least in part, the plurality of information associated with the telemetry system. For instance, for reach permutation as ATBS (e.g., via telemetry process 10) is called, telemetry process 10 extracts parameters (e.g., mean overall data and mean overhead). Then, telemetry process 10 inputs the parameters extracted to the classifier (discussed further below). So, for this example, mean of all the overall data (e.g., plot 802) and overall overhead (e.g., plot 806) are shown in ATBS. Thus, there are two parameters, overall data and overhead, although it will be appreciated after reading the present disclosure that more or less parameters may be used without departing from the scope of the present disclosure. In some implementations, one of the example elements of telemetry process 10 (aside from the classifier), are the data exchange messages (DEMs) (shown in plot 804), which directly correlates to the input geometry from the avionics data containers.

In some implementations, telemetry process 10 can perform 306 a plurality of iterations with the permutation matrix based upon, at least in part, the one or more parameters extracted for use in the permutation matrix. For instance, telemetry process 10 may go through all the possible permutations of the input matrix. For example, there may be two layers of 4 nodes, so the combination is 4×4 for each box. In the non-limiting example, there are two boxes, for each permutation for box1, box2 has 16 possible permutations. Thus, the overall is 16×16=256 or $(M \times N)^n$ where M is the number of the first layer (WF in FIG. 8), and N is number of second layer (DR in FIG. 8), and n is number of avionics data containers (e.g., LB and RB, or 2 in this example).

Figure 7:
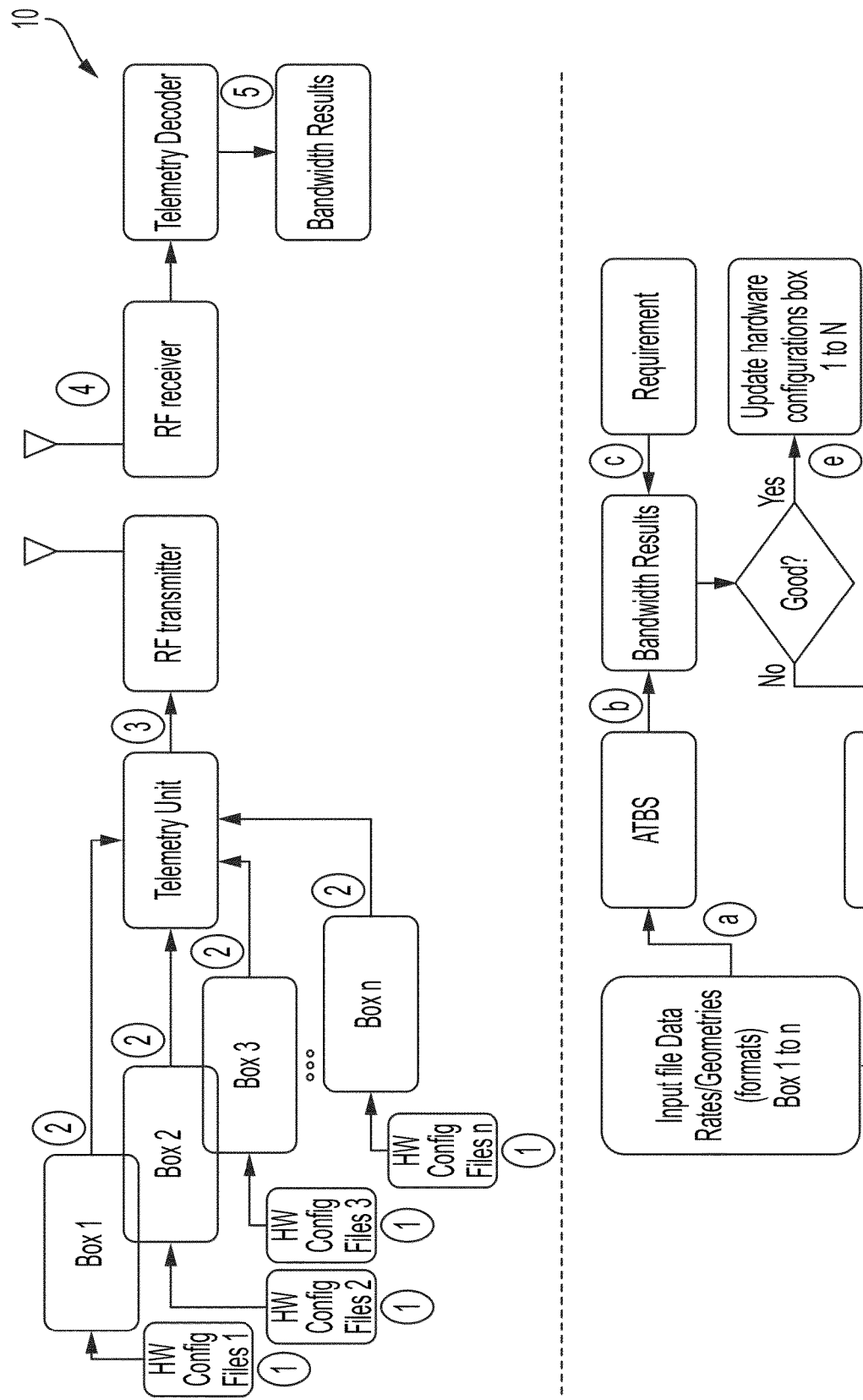
FIG. 7 is an example flowchart of a telemetry process according to one or more example implementations of the disclosure.

In some implementations, telemetry process 10 can provide 308 a final telemetry geometry for the telemetry system. For instance, based on classification (discussed below), telemetry process 10 may select the most optimized permutation based on overall data and overhead, and even other factors like complexity, etc. The final telemetry geometry for the telemetry system may then be used in the hardware configurations (e.g., as shown in FIG. 7).

Figure 9:
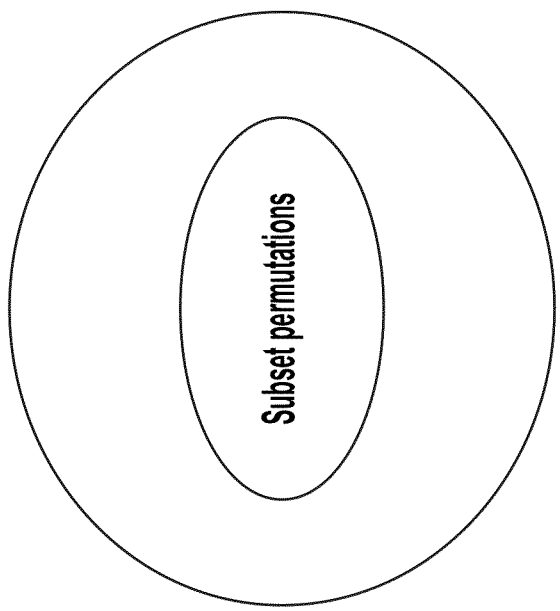
FIG. 9 is an example diagrammatic view of a permutation matrix/classification performed by a telemetry process according to one or more example implementations of the disclosure.

In some implementations, providing the final telemetry geometry for the telemetry system can include performing 310 a multi-classification of the plurality of iterations. For instance, and referring at least to the example implementation of FIG. 9, an example permutation matrix/classification 900a and 900b is shown. In some implementations, the multi-classification may be a binary classification (e.g., good/bad, 0/1, etc.) as shown in permutation matrix/classification 900a, or multiple classifications (e.g., good/bad/fair/marginal, etc.) as shown in permutation matrix/classification 900b. Based on requirement, telemetry process 10 may construct the multi-class classifier. For instance, assume for example purposes only that it is desired to determine the overall data between a and b, and overhead to be between c and d. If it gets closer to the boundaries, it may be referred to as marginal., e.g., within e distance of boundary edges, and if it is outside the boundaries, it may be referred to as bad. Other classifications are possible without departing from the scope of the present disclosure.

In some implementations, the multi-classification of the plurality of iterations can be based upon one or more of a cylindrical region and an elliptical region. For instance, and referring again to FIG. 8, classification 808 is shown as a 3D classifier. In the example, there may be center (x, y) and radius r1 and r2 from the center. Thus, r1 and r2 can be same value making it a cylindrical base or different values making it an elliptical base. Notably, the height is the length of the permutations.

In some implementations, providing the final telemetry geometry for the telemetry system can include down selecting 312 the plurality of iterations. For instance, down selecting is going from hundreds of permutations to maybe a few good ones (based upon the above-noted classification), and then making a final selection among those good ones to pick the "best" based on various factors (e.g., best optimized based on overall data, overhead, complexity, etc.). In some implementations, down selecting may be automated based on the classification, although the final selection may also have an end user in the loop to decide on the last design permutations based on all the optimization factors, etc.

Clause 1. A computer-implemented method comprising: identifying, by a computing device, a plurality of information associated with a telemetry system; constructing a permutation matrix for use with the telemetry system; extracting one or more parameters for use in the permutation matrix based upon, at least in part, the plurality of information associated with the telemetry system; performing a plurality of iterations with the permutation matrix based upon, at least in part, the one or more parameters extracted for use in the permutation matrix; and providing a final telemetry geometry for the telemetry system.

Clause 2. The computer-implemented method of any of clauses 1-7, The plurality of information associated with the telemetry system can include one or more aviation data containers, phases of flight, data rates for each aviation data container per format, word geometry, input window size time, or combinations thereof.

Clause 3. The computer-implemented method of any of clauses 1-7 further comprising constructing a plurality of frame arrivals based upon, at least in part, the plurality of information associated with the telemetry system.

Clause 4. The computer-implemented method of any of clauses 1-7, wherein providing the final telemetry geometry for the telemetry system includes performing a multi-classification of the plurality of iterations.

Clause 5. The computer-implemented method of any of clauses 1-7, wherein the multi-classification of the plurality of iterations is based upon one or more of a cylindrical region and an elliptical region.

Clause 6. The computer-implemented method of any of clauses 1-7, wherein providing the final telemetry geometry for the telemetry system includes down selecting the plurality of iterations.

Clause 7. The computer-implemented method of any of clauses 1-7 further comprising: optimizing at least a portion of the plurality of information associated with the telemetry system; and using at least the portion of the plurality of information associated with the telemetry system after optimization as hardware configuration files.

Clause 8. A computer program product residing on a computer readable storage medium having a plurality of instructions stored thereon which, when executed across one or more processors, causes at least a portion of the one or more processors to perform operations comprising: identifying a plurality of information associated with a telemetry system; constructing a permutation matrix for use with the telemetry system; extracting one or more parameters for use in the permutation matrix based upon, at least in part, the plurality of information associated with the telemetry system; performing a plurality of iterations with the permutation matrix based upon, at least in part, the one or more parameters extracted for use in the permutation matrix; and providing a final telemetry geometry for the telemetry system.

Clause 9. The computer program product of any of clauses 8-14, wherein the plurality of information associated with the telemetry system includes The plurality of information associated with the telemetry system can include one or more aviation data containers, phases of flight, data rates for each aviation data container per format, word geometry, input window size time, or combinations thereof.

Clause 10. The computer program product of clauses 8-14, wherein the operations further comprise constructing a plurality of frame arrivals based upon, at least in part, the plurality of information associated with the telemetry system.

Clause 11. The computer program product of clauses 8-14, wherein providing the final telemetry geometry for the telemetry system includes performing a multi-classification of the plurality of iterations.

Clause 12. The computer program product of clauses 8-14, wherein the multi-classification of the plurality of iterations is based upon one or more of a cylindrical region and an elliptical region.

Clause 13. The computer program product of clauses 8-14, wherein providing the final telemetry geometry for the telemetry system includes down selecting the plurality of iterations.

Clause 14. The computer program product of clauses 8-14 wherein the instructions further comprise: optimizing at least a portion of the plurality of information associated with the telemetry system; and using at least the portion of the plurality of information associated with the telemetry system after optimization as hardware configuration files.

Clause 15. A computing system including one or more processors and one or more memories configured to perform operations comprising: identifying a plurality of information associated with a telemetry system; constructing a permutation matrix for use with the telemetry system; extracting one or more parameters for use in the permutation matrix based upon, at least in part, the plurality of information associated with the telemetry system; performing a plurality of iterations with the permutation matrix based upon, at least in part, the one or more parameters extracted for use in the permutation matrix; and providing a final telemetry geometry for the telemetry system.

Clause 16. The computing system of clauses 15-21, wherein the plurality of information associated with the telemetry system includes The plurality of information associated with the telemetry system can include one or more aviation data containers, phases of flight, data rates for each aviation data container per format, word geometry, input window size time, or combinations thereof.

Clause 17. The computing system of clauses 15-21, wherein the operations further comprise constructing a plurality of frame arrivals based upon, at least in part, the plurality of information associated with the telemetry system.

Clause 18. The computing system of clauses 15-21, wherein providing the final telemetry geometry for the telemetry system includes performing a multi-classification of the plurality of iterations.

Clause 19. The computing system of clauses 15-21, wherein the multi-classification of the plurality of iterations is based upon one or more of a cylindrical region and an elliptical region.

Clause 20. The computing system of clauses 15-21, wherein providing the final telemetry geometry for the telemetry system includes down selecting the plurality of iterations.

Clause 21. The computing system of clauses 15-21, wherein the instructions further comprise: optimizing at least a portion of the plurality of information associated with the telemetry system; and using at least the portion of the plurality of information associated with the telemetry system after optimization as hardware configuration files.

The terminology used herein is for the purpose of describing particular implementations only and is not intended to be limiting of the disclosure. As used herein, the singular forms "a", "an" and "the" are intended to include the plural forms as well, including any steps performed by a/the computer/processor, unless the context clearly indicates otherwise. As used herein, the phrase "at least one of A, B, and C" should be construed to mean a logical (A OR B OR C), using a non-exclusive logical OR, and should not be construed to mean "at least one of A, at least one of B, and at least one of C." As another example, the language "at least one of A and B" (and the like) as well as "at least one of A or B" (and the like) should be interpreted as covering only A, only B, or both A and B, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof. Example sizes/models/values/ranges can have been given, although examples are not limited to the same.

The terms (and those similar to) "coupled," "attached," "connected," "adjoining," "transmitting," "receiving," "connected," "engaged," "coupled," "adjacent," "next to," "on top of," "above," "below," "abutting," and "disposed," used herein is to refer to any type of relationship, direct or indirect, between the components in question, and is to apply to electrical, mechanical, fluid, optical, electromagnetic, electromechanical, or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action is to occur, either in a direct or indirect manner. The term "set" does not necessarily exclude the empty set—in other words, in some circumstances a "set" can have zero elements. The term "non-empty set" can be used to indicate exclusion of the empty set—that is, a non-empty set must have one or more elements, but this term need not be specifically used. The term "subset" does not necessarily require a proper subset. In other words, a "subset" of a first set can be coextensive with (equal to) the first set. Further, the term "subset" does not necessarily exclude the empty set—in some circumstances a "subset" can have zero elements.

The corresponding structures, materials, acts, and equivalents (e.g., of all means or step plus function elements) that can be in the claims below are intended to include any structure, material, or act for performing the function in combination with other claimed elements as specifically claimed. While the disclosure describes structures corresponding to claimed elements, those elements do not necessarily invoke a means plus function interpretation unless they explicitly use the signifier "means for." Unless otherwise indicated, recitations of ranges of values are merely intended to serve as a shorthand way of referring individually to each separate value falling within the range, and each separate value is hereby incorporated into the specification as if it were individually recited. While the drawings divide elements of the disclosure into different functional blocks or action blocks, these divisions are for illustration only. According to the principles of the present disclosure, functionality can be combined in other ways such that some or all functionality from multiple separately-depicted blocks can be implemented in a single functional block; similarly, functionality depicted in a single block can be separated into multiple blocks. Unless explicitly stated as mutually exclusive, features depicted in different drawings can be combined consistent with the principles of the present disclosure.

The description of the present disclosure has been presented for purposes of illustration and description but is not intended to be exhaustive or limited to the disclosure in the form disclosed. After reading the present disclosure, many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated. The features of any dependent claim can be combined with the features of any of the independent claims or other dependent claims.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   identifying, by a computing device, a plurality of information associated with a telemetry system;
   constructing a permutation matrix for use with the telemetry system;
   extracting one or more parameters for use in the permutation matrix based upon, at least in part, the plurality of information associated with the telemetry system;
   performing a plurality of iterations with the permutation matrix based upon, at least in part, the one or more parameters extracted for use in the permutation matrix; and
   providing a final telemetry geometry for the telemetry system.

2. The computer-implemented method of claim 1, wherein providing the final telemetry geometry for the telemetry system includes performing a multi-classification of the plurality of iterations.

3. The computer-implemented method of claim 2, wherein the multi-classification of the plurality of iterations is based upon one or more of a cylindrical region and an elliptical region.

4. The computer-implemented method of claim 1, wherein the plurality of information associated with the telemetry system includes one or more aviation data containers, phases of flight, data rates for each aviation data container per format, word geometry, input window size time, or combinations thereof.

5. The computer-implemented method of claim 1 further comprising constructing a plurality of frame arrivals based upon, at least in part, the plurality of information associated with the telemetry system.

6. The computer-implemented method of claim 1, wherein providing the final telemetry geometry for the telemetry system includes down selecting the plurality of iterations.

7. The computer-implemented method of claim 1 further comprising:
   optimizing at least a portion of the plurality of information associated with the telemetry system; and
   using at least the portion of the plurality of information associated with the telemetry system after optimization as hardware configuration files.

8. A computer program product residing on a computer readable storage medium having a plurality of instructions stored thereon which, when executed across one or more processors, causes at least a portion of the one or more processors to perform operations comprising:
   identifying a plurality of information associated with a telemetry system;
   constructing a permutation matrix for use with the telemetry system;
   extracting one or more parameters for use in the permutation matrix based upon, at least in part, the plurality of information associated with the telemetry system;
   performing a plurality of iterations with the permutation matrix based upon, at least in part, the one or more parameters extracted for use in the permutation matrix; and
   providing a final telemetry geometry for the telemetry system.

9. The computer program product of claim 8, wherein the operations further comprise constructing a plurality of frame arrivals based upon, at least in part, the plurality of information associated with the telemetry system.

10. The computer program product of claim 8, wherein providing the final telemetry geometry for the telemetry system includes performing a multi-classification of the plurality of iterations.

11. The computer program product of claim 10, wherein the multi-classification of the plurality of iterations is based upon one or more of a cylindrical region and an elliptical region.

12. The computer program product of claim 8, wherein the plurality of information associated with the telemetry system includes one or more aviation data containers, phases of flight, data rates for each aviation data container per format, word geometry, input window size time, or combinations thereof.

13. The computer program product of claim 8, wherein providing the final telemetry geometry for the telemetry system includes down selecting the plurality of iterations.

14. The computer program product of claim 8, wherein the operations further comprise:
   optimizing at least a portion of the plurality of information associated with the telemetry system; and
   using at least the portion of the plurality of information associated with the telemetry system after optimization as hardware configuration files.

15. A computing system including one or more processors and one or more memories configured to perform operations comprising:
   identifying a plurality of information associated with a telemetry system;
   constructing a permutation matrix for use with the telemetry system;
   extracting one or more parameters for use in the permutation matrix based upon, at least in part, the plurality of information associated with the telemetry system;
   performing a plurality of iterations with the permutation matrix based upon, at least in part, the one or more parameters extracted for use in the permutation matrix; and
   providing a final telemetry geometry for the telemetry system.

16. The computing system of claim 15, wherein the operations further comprise constructing a plurality of frame arrivals based upon, at least in part, the plurality of information associated with the telemetry system.

17. The computing system of claim 16, wherein providing the final telemetry geometry for the telemetry system includes performing a multi-classification of the plurality of iterations.

18. The computing system of claim 17, wherein the multi-classification of the plurality of iterations is based upon one or more of a cylindrical region and an elliptical region.

19. The computing system of claim 15, wherein the plurality of information associated with the telemetry system includes one or more aviation data containers, phases of flight, data rates for each aviation data container per format, word geometry, input window size time, or combinations thereof.

20. The computing system of claim 15, wherein providing the final telemetry geometry for the telemetry system includes down selecting the plurality of iterations.

* * * * *